United States Patent Office 3,145,077
Patented Aug. 18, 1964

3,145,077
PREPARATION OF PHOSPHORYL ISOCYANATES
Harold Crosbie Fielding, Northwich, England, assignor to Imperial Chemical Industries Limited, London, England, a corporation of Great Britain
No Drawing. Filed Dec. 26, 1961, Ser. No. 162,240
Claims priority, application Great Britain Jan. 12, 1961
4 Claims. (Cl. 23—14)

This invention relates to a novel method for preparing phosphoryl triisocyanate and substituted phosphoryl isocyanates.

Phosphoryl triisocyanate PO(NCO)$_3$ is difficult to prepare in satisfactory yield from phosphoryl trichloride and sodium cyanate but it may conveniently be prepared in good yield by oxidation of phosphorus triisocyanate for example with nitrogen dioxide, the phosphorus triisocyanate being itself very conveniently prepared by the reaction of phosphorus trichloride and sodium cyanate or potassium cyanate in a polar solvent or in a mixture of polar and non-polar solvents as described in application Serial No. 41,437, filed May 26, 1960.

It has been found a convenient way of combining in one reaction system the preparation of phosphorus triisocyanate and its oxidation. The present process uses liquid sulphur dioxide as the polar solvent and sulphur trioxide as the oxidising agent. In oxidising a phosphorus isocyanate to the corresponding phosphoryl isocyanate sulphur trioxide is reduced to sulphur dioxide, which then very conveniently becomes part of the solvent system.

According to the present invention, there is provided a process for making phosphoryl triisocyanate comprising reacting phosphorus trichloride with sodium cyanate or potassium cyanate in a liquid sulphur dioxide medium to give a solution of the phosphorus triisocyanate therein, and subsequently reacting said solution with sulphur trioxide, separating sodium chloride or potassium chloride from the reaction mixture and distilling phosphoryl triisocyanate from the latter.

The process of this invention is not restricted to making phosphoryl triisocyanate since substituted phosphoryl isocyanates having the general formula OPR$_x$(NCO)$_{3-x}$, where $x$ is 1 or 2 and R represents a monovalent organic group or groups, may likewise be made in a further embodiment of the invention starting from the corresponding substituted phosphorus chloride PR$_x$Cl$_{3-x}$, provided the organic group is not attacked by sulphur trioxide.

The reaction between the metallic cyanate and the phosphorus chloride is exothermic and may be controlled by refluxing sulphur dioxide from the system or by removing heat by means of external cooling. It can take place at temperatures from about −20° C. up to 80° C. or even higher under pressure. Convenient temperatures are from −10° C., the boiling point of sulphur dioxide at atmospheric pressure, to 30° or 40° C. under pressures of up to ten atmospheres.

The oxidation reaction is also exothermic and is conveniently carried out by blowing sulphur trioxide vapour into the reaction system, or by adding to it liquid sulphur trioxide, preferably dissolved in liquid sulphur dioxide, or solid sulphur trioxide. The reaction may likewise be controlled by refluxing sulphur dioxide or by cooling externally, and it may be carried out at −10° C. or somewhat below at atmospheric pressure or at higher temperatures under pressure.

The sodium or potassium chlorides formed in the first stage are preferably removed at the end of that stage, but if desired may remain in the system until the second stage is complete. The product is separated from liquid sulphur dioxide and any unchanged isocyanates by fractional distillation. Since phosphoryl triisocyanate forms an adduct with sulphur trioxide it is preferable to keep a slight excess of phosphorus triisocyanate in the reaction system in order to use up any free sulphur trioxide.

The following examples illustrate the invention; all quantities are in parts by weight.

Example 1

Sodium cyanate (100 parts of 98% NaOCN) and liquid sulphur dioxide (200 parts) were charged to a vessel fitted with a dropping funnel, sealed stirrer and reflux condenser, the whole being protected from entry of atmospheric moisture by guard tubes containing silica gel. Acetone cooled in a bath of acetone/solid carbon dioxide was circulated through the condenser. Phosphorus trichloride (69 parts) was then added dropwise and with stirring during 10 minutes, after which the reaction mixture was stirred under reflux for a further 3 hours. The resulting mixture was then filtered into a cooled receiver, and the filter cake washed with liquid sulphur dioxide (2 x 50 parts).

The combined filtrate and washings were then returned to the reaction vessel, and liquid sulphur trioxide (36 parts) dissolved in liquid sulphur dioxide (100 parts) was added dropwise to the stirred reaction mixture during 20 minutes, the exothermic reaction causing vigorous refluxing of sulphur dioxide in the cooled condenser. On completion of the addition, sulphur dioxide was distilled from the reaction at atmospheric pressure. The remaining liquid on vacuum distillation gave 5 parts of phosphorus triisocyanate and 60 parts of phosphoryl triisocyanate, B.P. 78° C. at 20 mm. and 88° C. at 10 mm. respectively.

Example 2

Sodium cyanate (100 parts, 98% NaOCN) and liquid sulphur dioxide (200 parts) were charged to a stirred autoclave cooled to −20° C. in solid carbon dioxide. Phosphorus trichloride (69 parts), cooled to −20° C., was then added and the autoclave sealed, after which the contents were stirred at room temperature for 20 minutes, and then slowly warmed to 40° C. during one hour. Maximum internal temperature and pressure reached 45° C. and 7 atmospheres respectively. The autoclave was cooled to 0° C., blown down, and the contents filtered, the filter cake being washed with liquid sulphur dioxide (2 x 50 parts). The combined filtrate and washings were then reacted with sulphur trioxide (38 parts) dissolved in sulphur dioxide (100 parts) as in the previous example. Removal of sulphur dioxide followed by distillation gave phosphorus triisocyanate (3 parts) and phosphoryl triisocyanate (64 parts).

What is claimed is:

1. Process for making phosphoryl triisocyanate comprising reacting phosphorus trichloride with a cyanate chosen from the group consisting of sodium cyanate and potassium cyanate in a liquid sulphur dioxide medium to give a solution of phosphorus triisocyanate therein, reacting said solution with sulphur trioxide, separating a chloride selected from the group consisting of sodium chloride and potassium chloride from the reaction mixture and distilling phosphoryl triisocyanate from the latter.

2. Process as claimed in claim 1 when carried out at temperatures from −20° C. to −10° C. and under atmospheric pressure.

3. Process as claimed in claim 1 when carried out at temperatures from −10° C. to 40° C. under a pressure of from one to ten atmospheres.

4. A process for the production of phosphoryl triisocyanate which comprises the steps of reacting phosphorus trichloride with a cyanate selected from the group consisting of sodium cyanate and potassium cyanate, in the absence of added water in a liquid sulphur dioxide reaction medium, at a temperature within the range of −20° C. to 80° C. and at pressures within the range of atmospheric to ten atmospheres, to form phosphorus triisocyanate in the reaction medium and a solid chloride selected from the group consisting of sodium chloride and potassium chloride, separating said solid chloride from the reaction medium and washing it with sulphour dioxide, returning the washings to the reaction medium, reacting the reaction medium with sulphur trioxide to form phosphoryl triisocyanate, and recovering said phosphoryl triisocyanate by distillation.

References Cited in the file of this patent

FOREIGN PATENTS 583,868     Canada _____ Sept. 22, 1959

OTHER REFERENCES

Van Wazer: "Phosphorus and its Compounds," vol. 1, Chemistry, published by Interscience Publishers, Inc., New York, 1958, pages 259–260.